(12) United States Patent
Septimio

(10) Patent No.: US 9,884,577 B2
(45) Date of Patent: Feb. 6, 2018

(54) VEHICLE CRANE

(71) Applicant: Augusto P. Septimio, Charlotte, NC (US)

(72) Inventor: Augusto P. Septimio, Charlotte, NC (US)

(*) Notice: Subject to any disclaimer, the term of this patent is extended or adjusted under 35 U.S.C. 154(b) by 15 days.

(21) Appl. No.: 14/455,370

(22) Filed: Aug. 8, 2014

(65) Prior Publication Data
US 2016/0039325 A1    Feb. 11, 2016

(51) Int. Cl.
*B60P 1/54*    (2006.01)

(52) U.S. Cl.
CPC .................................. *B60P 1/5423* (2013.01)

(58) Field of Classification Search
CPC ......... B60P 1/54; B60P 1/5404; B60P 1/5428; B60P 1/5433; B60P 1/5423
USPC .......................................................... 414/542
See application file for complete search history.

(56) References Cited

U.S. PATENT DOCUMENTS

| | | | | |
|---|---|---|---|---|
| 2,927,704 A * | 3/1960 | Condon | ................. | B65G 47/90 212/336 |
| 3,730,366 A * | 5/1973 | Berends | .................... | B60P 1/02 254/93 HP |
| 3,924,366 A * | 12/1975 | Gibbs | ................... | E04B 1/3444 414/498 |
| 5,718,555 A * | 2/1998 | Swalheim | ................. | B60P 1/36 414/502 |
| 5,862,926 A * | 1/1999 | Johnson | ................ | B60P 1/5442 212/180 |
| 7,850,026 B2 * | 12/2010 | McKay | ..................... | B66C 9/10 104/111 |
| 8,353,661 B2 * | 1/2013 | Morasse | .................. | B60P 3/08 410/26 |

FOREIGN PATENT DOCUMENTS

EP    0092152 A2 * 10/1983    ............. B66C 19/02

* cited by examiner

*Primary Examiner* — Anna Momper
*Assistant Examiner* — Ashley Romano
(74) *Attorney, Agent, or Firm* — Seth L. Hudson; Clements Bernard Walker, PLLC

(57) ABSTRACT

A crane system for loading and unloading stone slabs comprising: a front support structure including: a pair of vertical legs each secured at a bottom end to the bed or wall of a vehicle; a front horizontal cross beam secured to a top end of the vertical legs; a back support structure including: a pair of vertical legs each secured at a bottom end to the bed or wall of a vehicle; a back horizontal cross beam secured to a top end of the vertical legs; a pair of bracing members secured to the vertical legs and to each other to aid in the stabilization of the system; a horizontal lift beam slideably secured to the front and back horizontal cross beams; a trolley assembly slidably secured to the horizontal lift beam; and a hoist mechanism secured to the trolley assembly.

20 Claims, 9 Drawing Sheets

VEHICLE CRANE

FIELD OF THE INVENTION

The present invention relates to a device used as an aid in the transportation of slab materials including stone.

BACKGROUND OF THE INVENTION

There are numerous materials which are commonly used as countertop materials in kitchens around the world. These materials include laminate, wood, sheet metal, tile and stone. Looking back to at least the 1940's, the popularity of laminate for countertops can hardly be disputed. The popularity of laminate as a countertop material remained strong at least through the 1990's. However laminate has its drawbacks in that it is susceptible to chipping, scratching, melting and de-laminating. In the 1960's, Corian® was developed and introduced to consumers. Corian® is a solid surface material similar to stone, however it is still susceptible to scratches and discoloration.

Beginning in the late 1990's, the availability of less expensive computer numerically controlled (CNC) saws allowed granite to become much more affordable for middle-class households. After measurements are taken regarding the dimensions of a desired countertop, those measurements are exported into a computer which cuts the slab to exacting specifications including cut-outs for sinks, faucets and fixtures. After the slab is polished, it is then ready to be installed by a skilled installer.

One drawback of stone countertops is their weight. A large stone slab intended for a cabinet or island in a homeowner's kitchen may weigh several hundred pounds. Most facilities where stone countertops are produced have one or more the crane lifts to aid in moving the slab from place to another. These lifts are used to load the slab on to or within a truck to deliver to a customer. However, once on site, the lifts are no longer available and the slabs must be transported from a vehicle to a stone cart by hand.

In light of the difficulties installers have in loading and unloading heavy and cumbersome stone slab countertops from vehicles, it is clear that a need exists to provide a device which aids an installer with the loading and unloading of countertops from a vehicle.

SUMMARY OF THE INVENTION

A crane system for loading and unloading stone slabs comprising: a front support structure including: a pair of vertical legs each secured at a bottom end to the bed or wall of a vehicle; a front horizontal cross beam secured to a top end of the vertical legs; a back support structure including: a pair of vertical legs each secured at a bottom end to the bed or wall of a vehicle; a back horizontal cross beam secured to a top end of the vertical legs; a pair of bracing members secured to the vertical legs and to each other to aid in the stabilization of the system; a horizontal lift beam slideably secured to the front and back horizontal cross beams; a trolley assembly slidably secured to the horizontal lift beam; and a hoist mechanism secured to the trolley assembly.

BRIEF DESCRIPTION OF THE DRAWINGS

FIG. 1A is a close-up view of part of the vehicle crane.
FIG. 1B is a close-up view of part of the vehicle crane.

DETAILED DESCRIPTION

Figure 1:
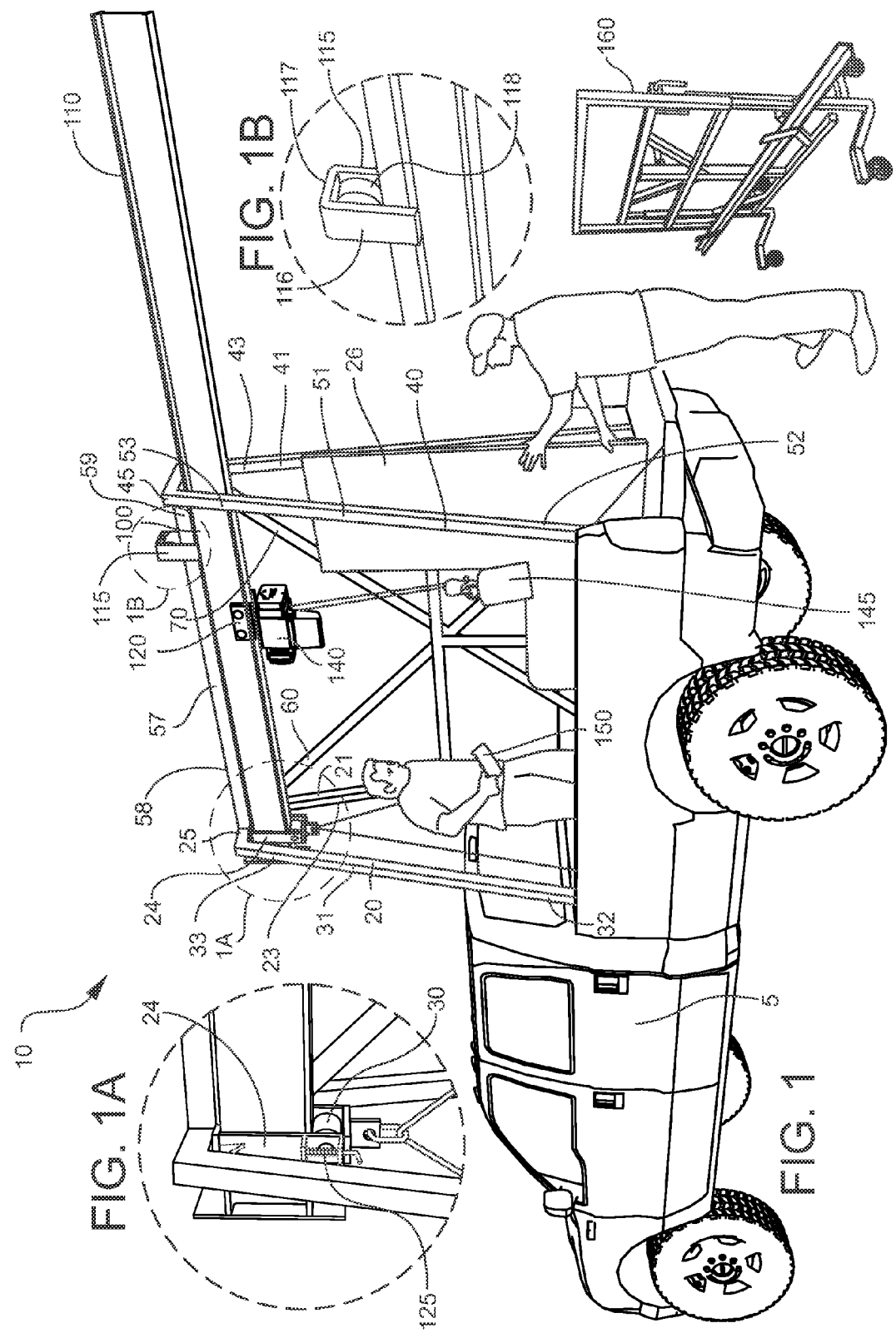
FIG. 1 is a proximal view of a vehicle crane.
Figure 2:
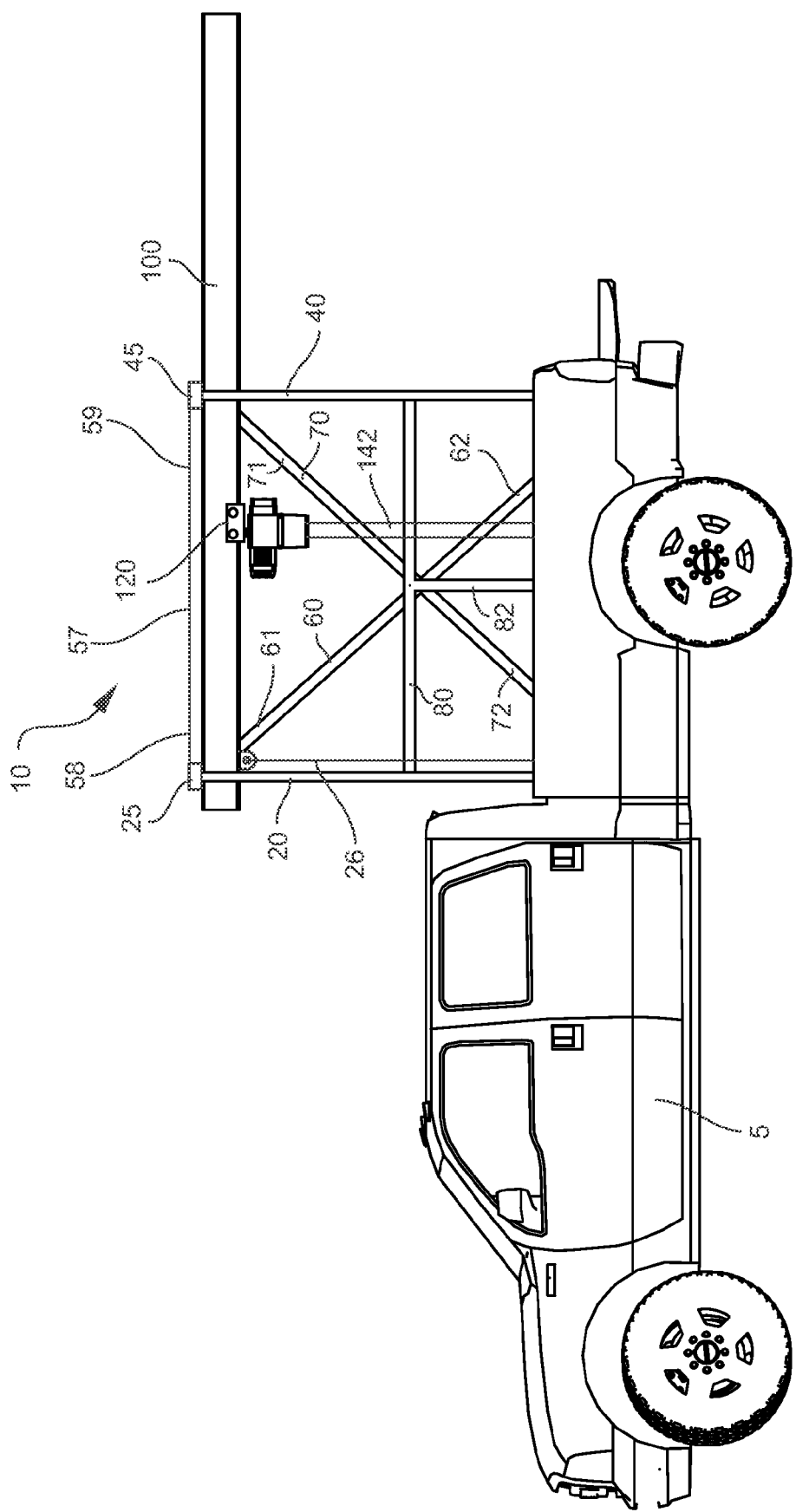
FIG. 2 is a side view of a vehicle crane.
Figure 3:
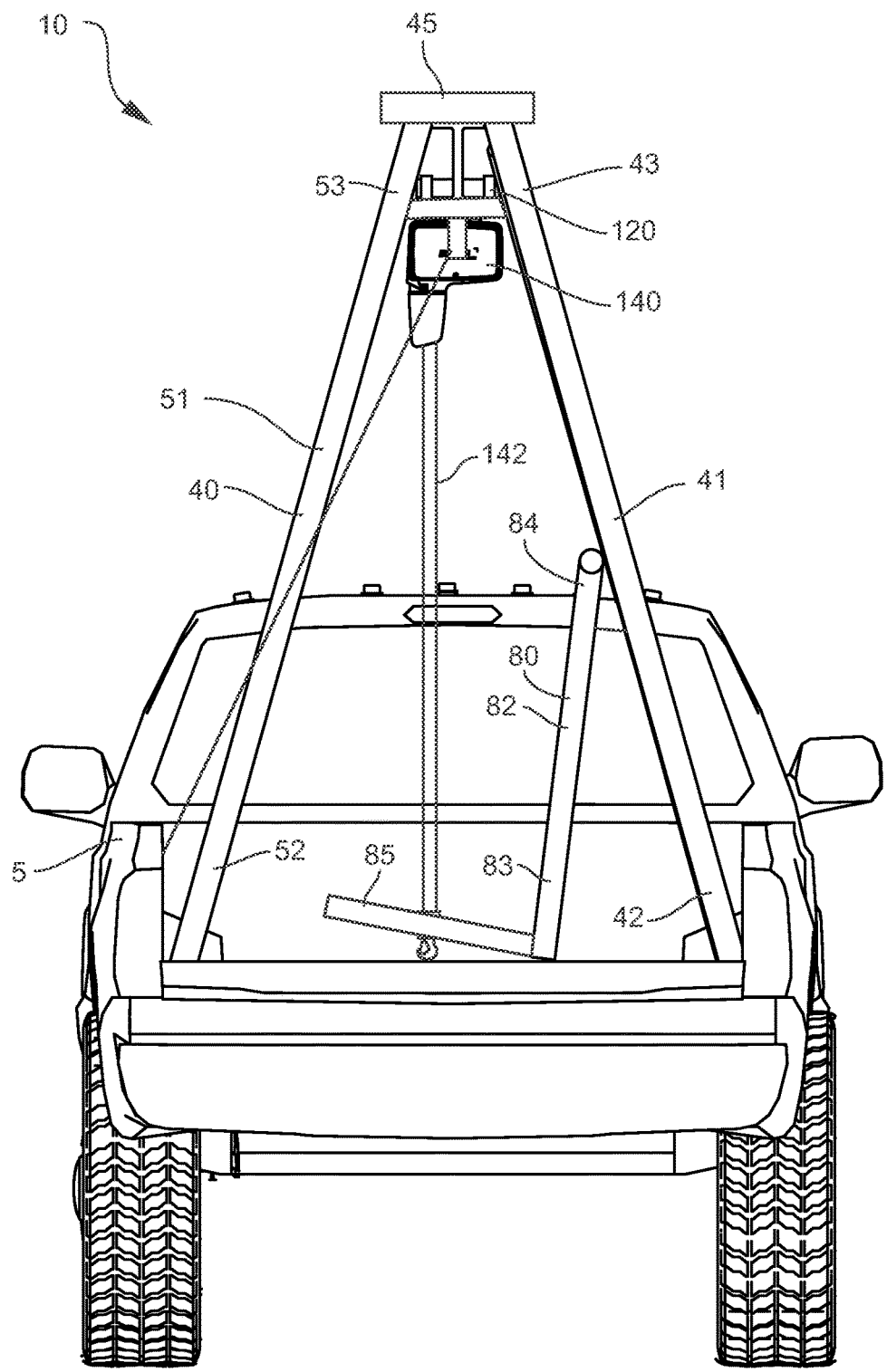
FIG. 3 is a front view of a vehicle crane.
Figure 4:
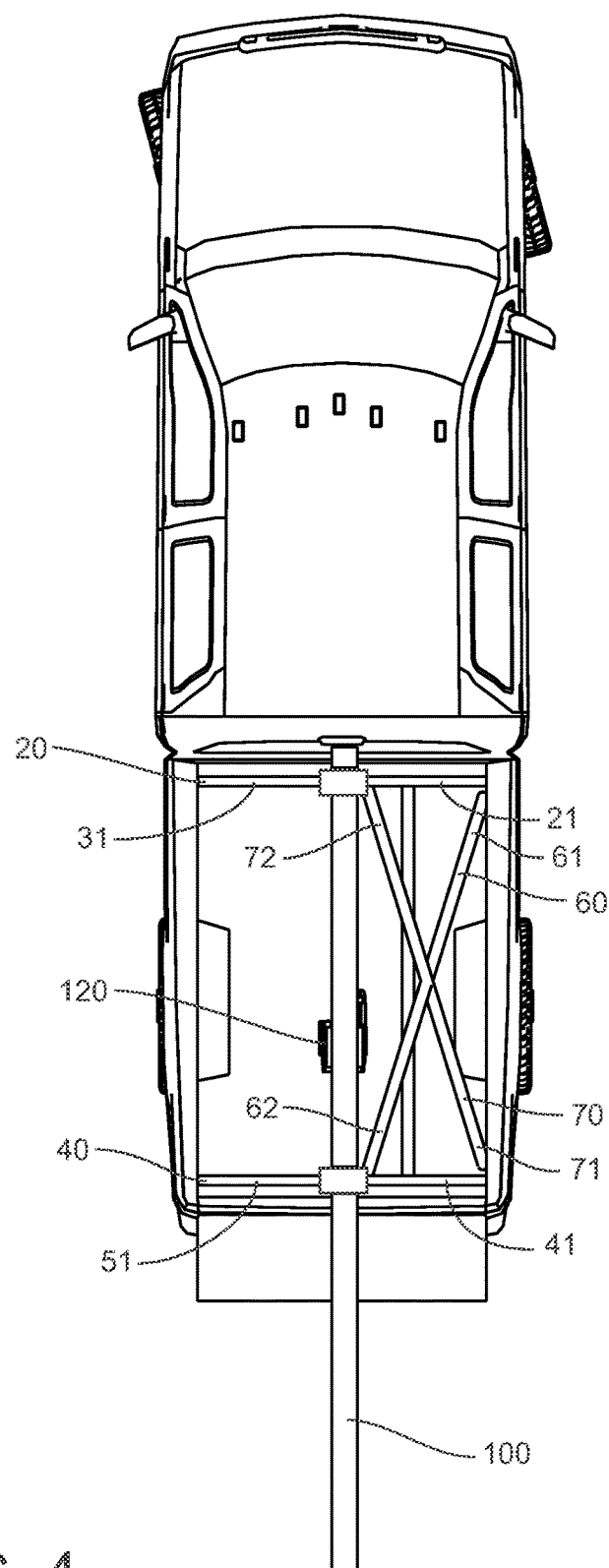
FIG. 4 is a rear view of a vehicle crane.
Figure 5:
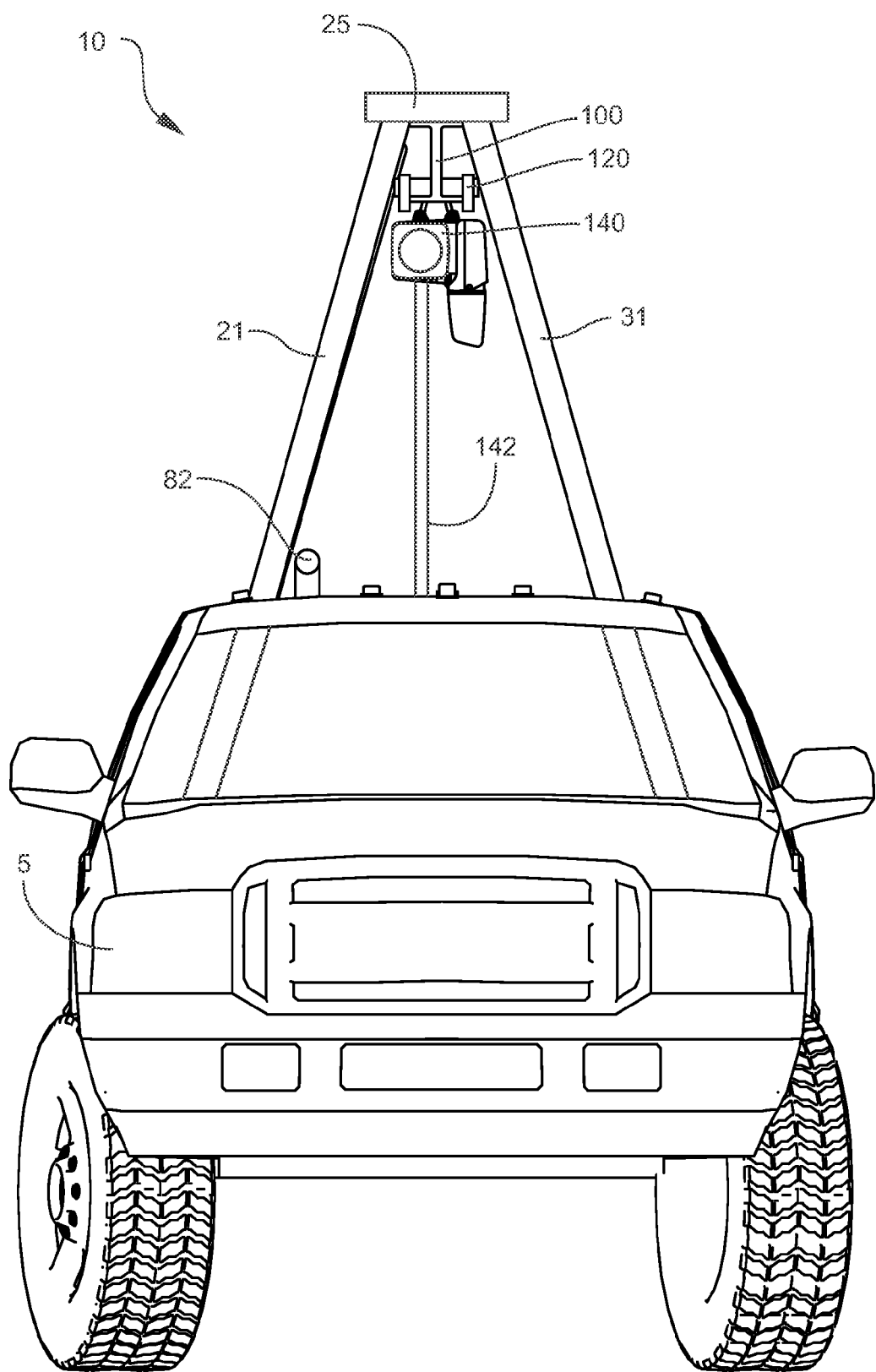
FIG. 5 is a proximal front view of a vehicle crane.
Figure 6:
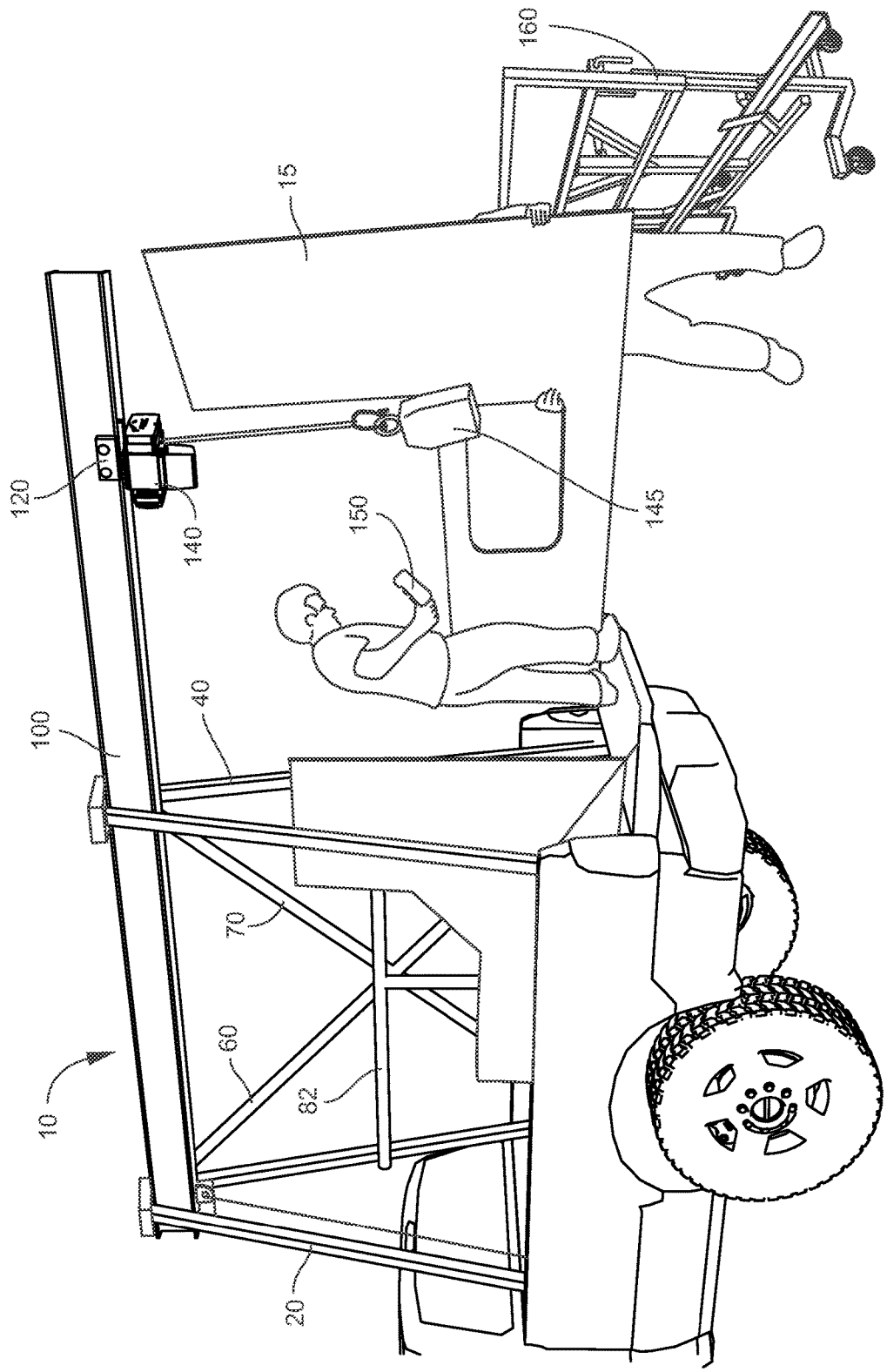
FIG. 6 is a side view of a vehicle crane.
Figure 7:
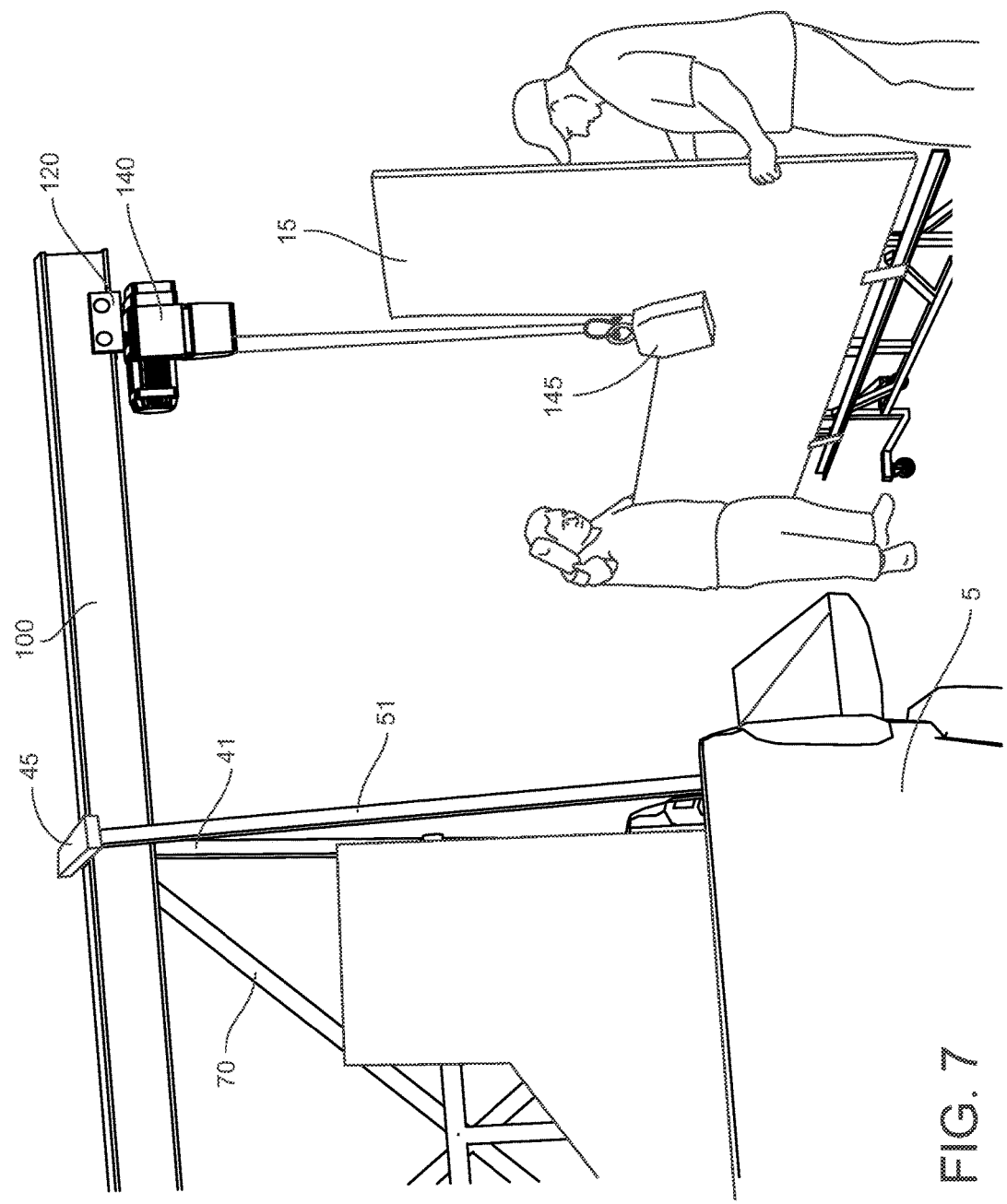
FIG. 7 is a proximal side view of a vehicle crane.

The instant invention describes a crane system 10 for loading and unloading stone slabs 15 comprising: a front support structure 20 including: a right vertical leg 21 secured at a bottom end 22 to the bed or wall of a vehicle 5; a left vertical leg 31 secured at a bottom end 32 to the bed or wall of a vehicle 5; a front horizontal cross beam 25 secured on one side to a top end 23 of the right vertical leg 21 and secured on an opposite side to a top end 33 of the left vertical leg 31; a back support structure 40 including: a right vertical leg 41 secured at a bottom end 42 to the bed or wall of a vehicle 5; a left vertical leg 51 secured at a bottom end 52 to the bed or wall of a vehicle 5; a back horizontal cross beam 45 secured on one side to a top end 43 of the right vertical leg 41 and secured on an opposite side to a top end 53 of the left vertical leg 51; a horizontal support beam 57 secured at a front end 58 to the front horizontal cross beam 25 and secured at a back end 59 to the back horizontal cross beam 45; a first bracing member 60 having a proximal end 61 which is secured to the bottom end of a vertical leg of the front support structure 20 and having a distal end 62 which is secured to the top end of a vertical leg of the back support structure 40; a second bracing member 70 having a proximal end 71 which is secured to the bottom end of a vertical leg of the back support structure 40 and having a distal end 72 which is secured to the top end of a vertical leg of the front support structure 20; wherein the first bracing member 60 is secured to the second bracing member 70; a horizontal lift beam 100 slideably engaged to the front horizontal cross beam 25, the horizontal support beam 57, the back horizontal cross beam 45 and/or a combination thereof; wherein the slidable engagement permits the horizontal lift beam 100 to slide from the front end of the system to the back end of the system and from the back end of the system to the front end of the system to extend the range of the system 10; a trolley assembly 120 slidably secured to the horizontal lift beam 100; and a hoist mechanism 140 secured to the trolley assembly 120, wherein the hoist mechanism 140 is used to raise, lower, orient and transport a stone slab 15. The stone slab 15 may be lowered onto a slab cart 160 as shown in FIGS. 1, 6 and 7.

Stone slabs 15 are known and understood by those having knowledge in the art. Stone slabs 15 may refer to any materials which may be used as a horizontal surface in kitchens, bathrooms, lavatories, offices, workshops and workrooms which is generally installed upon a cabinet or similar structure. Stone slabs 15 may be made from any material known in the art. In one embodiment of the present invention, a stone slab 15 may be selected from the group including, natural stone (i.e., granite, marble), cultured stone, concrete, wood, composite material (i.e. Corian®, quartz), metal, tile, or a combination thereof.

Front support structure 20 describes a structure which includes one or more right vertical legs 21 secured at its bottom end 22 to the bed or wall of a vehicle 5 and one or more left vertical legs 31 secured at a bottom end 32 to the bed or wall of a vehicle 5. The front support structure 20 further includes a front horizontal cross beam 25 secured on one side to a top end 23 of a right vertical leg 21 and secured on an opposite side to a top end 33 of a left vertical leg 31. The front support structure 20 further comprises a rolling bracket 24 secured to the front horizontal cross beam 25 which is slideably or rollingly engaged by the horizontal lift beam 100 as shown in Figure . The front support structure 20 may be comprised of tubular members (round, square, etc.) of varying lengths, gauges and thicknesses, solid members, or a combination thereof. In any of the above embodiments, the metal used may be selected from the group including, but not limited to, iron, steel, aluminum, magnesium, titanium, or any combination (i.e. alloy) thereof. The front support structure 20 may further include one or more frame supports 55 in order to secure, support and/or strengthen the crane system. (See FIGS. 8 and 9). The rolling bracket 24 allows the telescopic traversal of the horizontal lift beam 100 relative to the front support structure 20 and the back support structure 40. The rolling bracket 24 may be comprised of a plate secured to the front horizontal cross beam 25 a pair of side plates secured to the upper plate which surrounds the horizontal lift beam 100 and also surrounds a wheel (or ball-bearing) which is engaged to the horizontal lift beam 100 and an upper plate which is secured to the ends of the side plates.

Back support structure 40 describes a structure which includes one or more right vertical legs 41 secured at a bottom end 42 to the bed or wall of a vehicle 5 and one or more left vertical legs 51 secured at a bottom end 52 to the bed or wall of a vehicle 5. The back support structure 20 further includes a back horizontal cross beam 45 secured on one side to a top end 43 of a right vertical leg 41 and secured on an opposite side to a top end 53 of a left vertical leg 51. The back support structure 40 may be comprised of tubular members (round, square, etc.) of varying lengths, gauges and thicknesses, solid members, or a combination thereof. In any of the above embodiments, the metal used may be selected from the group including, but not limited to, iron, steel, aluminum, magnesium, titanium, or any combination (i.e. alloy) thereof. The back support structure 40 may further include one or more frame supports 55 in order to secure, support and/or strengthen the crane system. (See FIGS. 8 and 9). In one embodiment of the present invention, the vertical legs (21, 31, 41, 51) may be inserted into the openings of a pickup truck bed wall which are designed to accept 2×4 boards or beams. In this embodiment, the vertical legs may be welded in place, set in place with an adhesive, or simply held in place by the weight of the vehicle crane.

The front support structure 20 and the back support structure 40 may be secured to one another using a horizontal support beam 57 having a front end 58 secured to the front support structure 20 and a back end 59 secured to the back support structure along with a first bracing member 60 having a proximal end 61 which is secured to the bottom end of a vertical leg of the front support structure 20 and having a distal end 62 which is secured to the top end of a vertical leg of the back support structure 40. A second bracing member 70 having a proximal end 71 which is secured to the bottom end of a vertical leg of the back support structure 40 and having a distal end 72 which is secured to the top end of a vertical leg of the front support structure 20. In one embodiment of the present invention, the first bracing member 60 is secured to the second bracing member 70. The bracing members may be comprised of tubular members (round, square, etc.) of varying lengths, gauges and thicknesses, solid members, or a combination thereof. In any of the above embodiments, the metal used may be selected from the group including, but not limited to, iron, steel, aluminum, magnesium, titanium, or any combination (i.e. alloy) thereof. In one embodiment of the instant invention one or more wire braces 26 may be used to further strengthen and secure the crane system 10 within a vehicle 5.

Horizontal lift beam 100 is slideably secured to the front horizontal cross beam 25 and slidably secured to the back horizontal cross beam 45 which permits the horizontal lift beam 100 to slide from the front end of the system to the back end of the system and from the back end of the system to the front end of the system to extend the lifting range of the system 10. In one embodiment of the present invention, the horizontal lift beam 100 is comprised of two or more sections which are telescopically engaged to one another in order to extend or retract as the horizontal lift beam 100 from the front of the system 10 toward the back of the system or from the back of the system 10 toward the front of the system depending on the needs of those using the system 10. In another embodiment of the present invention, the horizontal lift beam 100 is comprised of a single section which includes one or more rolling brackets 115 secured to the horizontal lift beam 100 and allowing the horizontal lift beam to slidably engage to the horizontal support beam 57 as shown in FIG. 1. The horizontal lift beam 100 may further comprise a rolling bracket 115 as illustrated in FIGS. 1, 1A and 1B. The rolling bracket 115 may be comprised of a pair of side plates 116 secured to the side of the horizontal lift beam 100 where the side plates 116 surround the horizontal support beam 57 and also surround a wheel 118 (or ball-bearing) which is engaged to the horizontal support beam 57 and an upper plate 117 which is secured to the ends of the side plates 116. The horizontal lift beam 100 may be any length which may be accommodated within a vehicle as described herein, including lengths of 12, 14, 16, 18, 20, 22, or 24 feet in certain embodiments.

A locking pin 125 (FIG. 1A) may be used to secure the horizontal lift beam 100 in a desired position relative to the vehicle 5. These positions may include being fully engaged to the front end of the vehicle, being fully engaged to the back end of the vehicle, or any location in between. A clamping mechanism (not shown) may also be used to secure the horizontal lift beam 100 in a desired position relative to the vehicle 5. The horizontal lift beam may be comprised of I-beams, tubular members (round, square, etc.) of varying lengths, gauges and thicknesses, solid members, or a combination thereof. In any of the above embodiments, the metal used may be selected from the group including, but not limited to, iron, steel, aluminum, magnesium, titanium, or any combination (i.e. alloy) thereof which possesses strength to transport stone slabs 15 without damaging the horizontal lift beam 100, the trolley assembly 120 or the stone slabs.

Trolley assembly 120, as used herein, refers to a device which is detachably or slidably secured to the horizontal lift beam 100. The horizontal lift beam 100 may be an I-beam as defined by those having skill in the art. In one embodiment, the shape of the horizontal lift beam 100 allows the trolley assembly 122 to traverse the length of the horizontal lift beam 100 using wheels (i.e., ball bearing wheels, etc.) or any other means of locomotion known in the art. The trolley assembly 120 allows a user of the crane system 10 to secure a stone slab 15 using the hoist mechanism 140, lift the stone slab 15 from within a vehicle 5 and maneuver the stone slab to the outside of the vehicle and lower the stone slab to one or more persons and/or a slab transportation cart to take the stone slab from the vehicle to the location where the slab is to be installed. In one embodiment of the present invention the trolley assembly 120 and the hoist mechanism 140 may be secured in place using one or more locking pins, clamps or any other means known in the art.

Hoist mechanism 140, as described herein, refers to a device which is secured to the trolley assembly 120, wherein the hoist mechanism 140 is used to raise, lower, orient and transport a stone slab 15 which is secured with a clamping device 145. The clamping device 145 is a device used for raising/lifting or lowering a load (i.e. a stone slab 15) by means of a drum or lift-wheel around which rope, cable or chain wraps. The hoist mechanism 140 may be operated manually, electrically or pneumatically driven and may use chain, fiber or wire rope as its lifting medium. In one embodiment of the instant invention, the hoist mechanism 140 may be operated as electrical, pneumatic, hydraulic, mechanical, or a combination thereof. In another embodiment, the hoist mechanism may include a winch which extends and retracts a cable 142 which is operationally associated with clamping device 145 in order to raise and lower the clamping device and a stone slab 15. In yet another embodiment, the hoist mechanism may include a winch which extends and retracts a cable 142 which is run through pulley or similar device which is operationally associated with clamping device 145 in order to raise and lower the clamping device and a stone slab 15. One or more persons may operate the trolley 120, the hoist mechanism 140, the clamping device 145 or any combination thereof with a hoist controller 150. The hoist controller 150 may be connected to the hoist mechanism 140 by a wire or may be connected wirelessly to operate the trolley 120, the hoist mechanism 140, the clamping device 145 or any combination thereof. In another embodiment, the vehicle 5 is selected from the group consisting of: a pick-up truck, a flat-bed truck, a moving truck, a box truck, or a combination thereof.

In one embodiment of the instant invention, the above described crane system 10 may further comprise a slab resting support 80 which includes a vertical support member 82 which is secured at a lower end 83 to the vehicle 5 and secured at a top end 84 near the top of one or more vertical legs (21, 31, 41, 51) and a horizontal support member 85 which emanates from the lower end 83 of the vertical support member 82 at ninety degrees so that the vertical support member is oriented at an angle to allow one or more stone slabs 15 to be temporarily secured for transport within the vehicle 5. In one embodiment of the instant invention, the angle created between the vertical support member 82 and the horizontal support member 85 may be in the range of 70 to 110°, 80 to 100°, 85 to 95° or any combination thereof.

In another embodiment of the instant invention, the front support structure 20 and/or the back support structure 40 further include one or more additional vertical legs (21, 31, 41, 51) for added strength and support of the crane system 10. Looking to FIGS. 8 and 9 there is shown in example of another embodiment of the instant invention wherein the front horizontal cross beam 25 and/or the back horizontal cross beam 45 each extend laterally as a front horizontal brace beam (not illustrated) and/or a back horizontal brace beam 46 to be secured to the ceiling and/or the wall of a vehicle 5 for added strength and support of the crane system 10.

Figure 8:
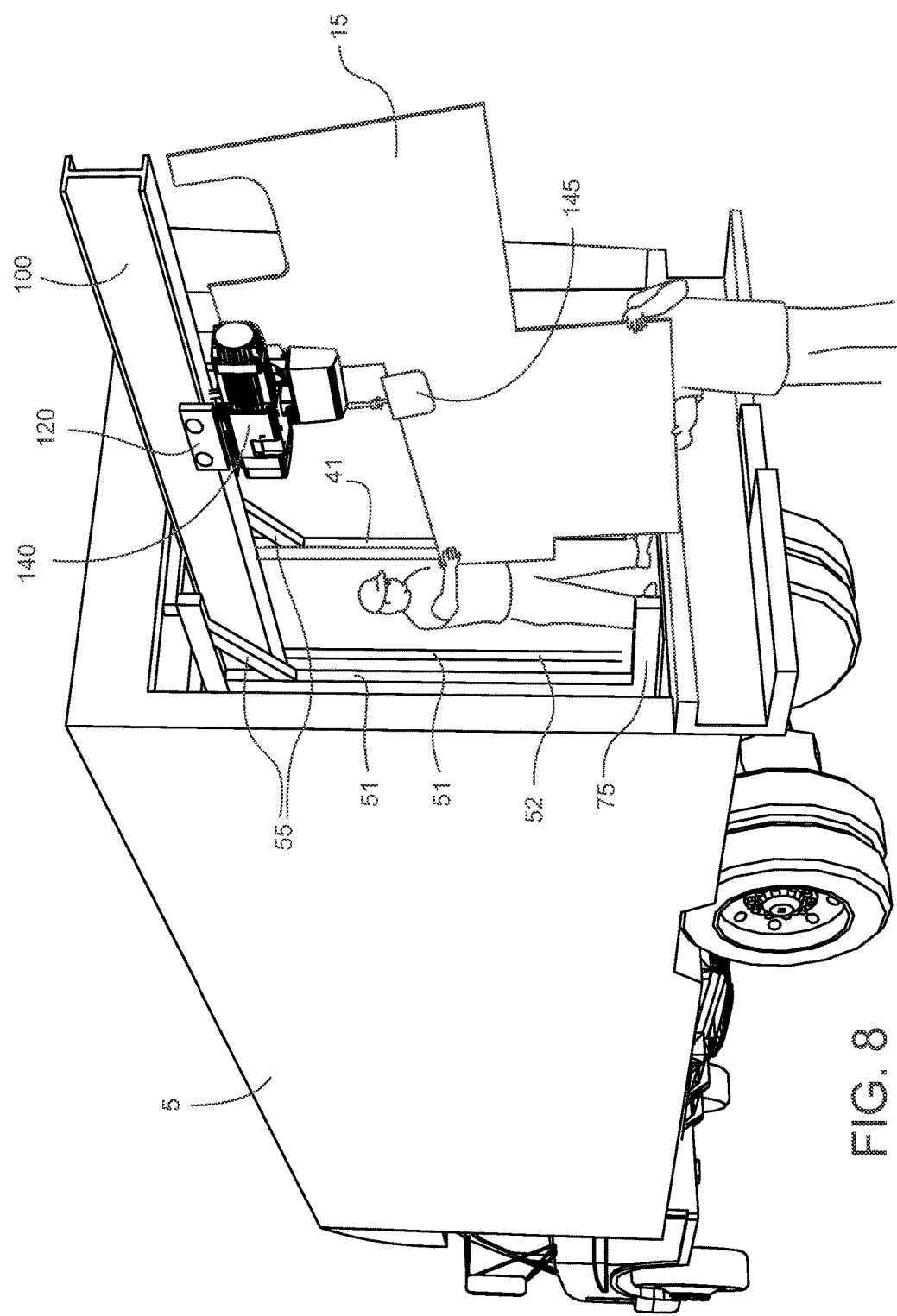
FIG. 8 is a proximal side view of a vehicle crane in a box truck.
Figure 9:
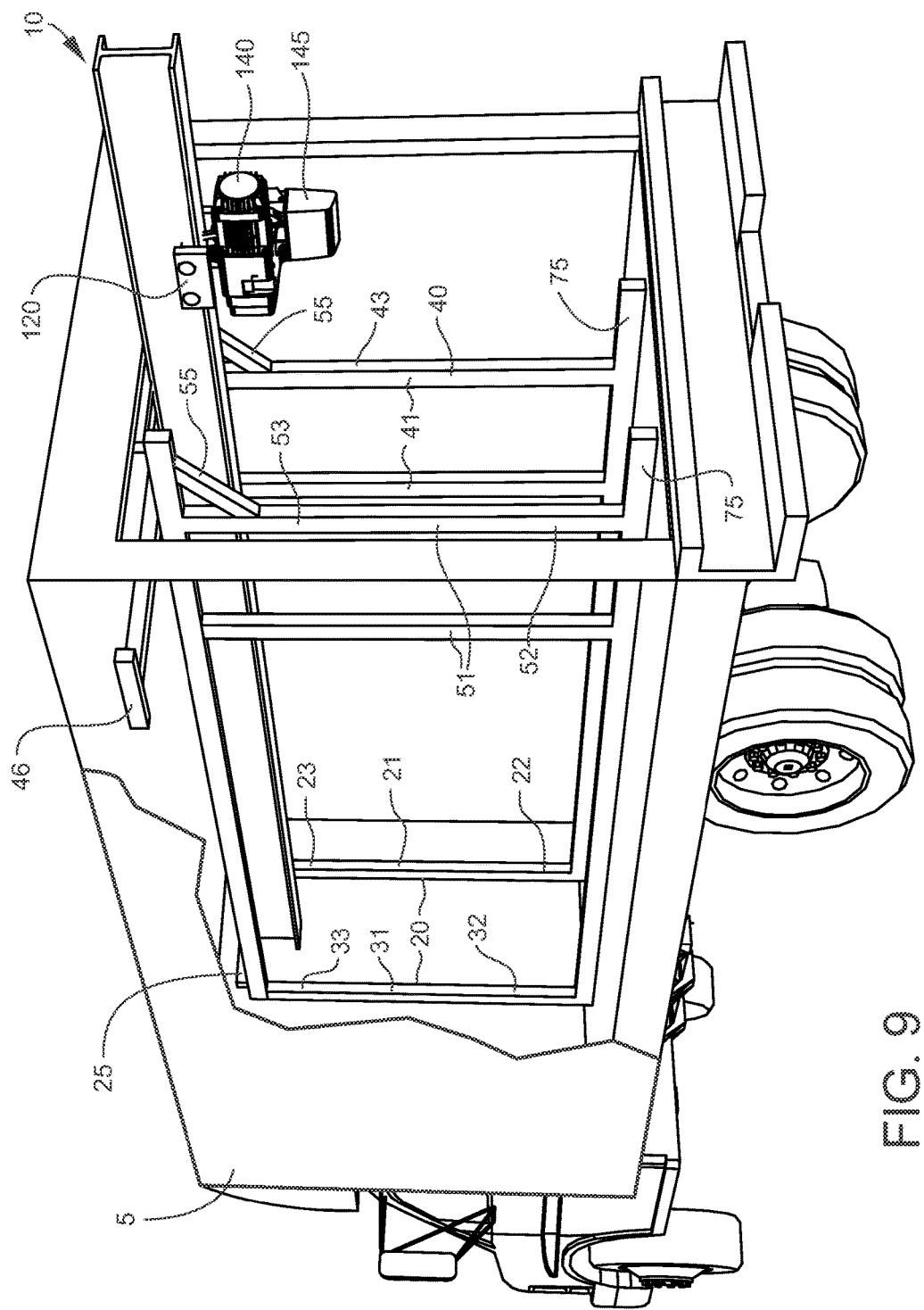
FIG. 9 is a proximal side view of the vehicle crane in a box truck.

FIGS. 1 through 7 illustrate an example of one embodiment of the instant invention wherein the vertical legs (21 and 31) of the front support structure 20 and the vertical legs (41 and 51) of the back support structure 40 are vertical at their bottoms (22, 32, 42 and 52 respectively) and then angled inward resulting in the distance between the tops of the vertical legs being narrower than the distance between the bottoms of the vertical legs. This may also be thought of as an "A-frame" configuration. In one embodiment, the angle of the vertical legs where it alters from vertical to an angle is in the range of 5 to 45°, 10 to 40°, 15 to 35°, 20 to 30° or 35°. FIGS. 8 and 9 illustrate an example of one embodiment of the crane system 10 used in the above method wherein the system is secured with in a box truck. Any and all connections between parts, pieces and/or sections of the invention described herein may be accomplished with welds, adhesives, fasteners, any means known in the art which has the strength to carry out the instant invention, or any combination thereof.

The instant invention also includes a method for loading and unloading one or more stone slabs 15 onto and off of a vehicle 5 comprising the steps of:

(a) providing a crane system 10 for loading and unloading stone slabs 15 comprising: a front support structure 20 including: a right vertical leg 21 secured at a bottom end 22 to the bed or wall of a vehicle 5 and a left vertical leg 31 secured at a bottom end 32 to the bed or wall of a vehicle 5; a front horizontal cross beam 25 secured on one side to a top end 23 of the right vertical leg 21 and secured on an opposite side to a top end 33 of the left vertical leg 31; a back support structure 40 including: a right vertical leg 41 secured at a bottom end 42 to the bed or wall of a vehicle 5; a left vertical leg 51 secured at a bottom end 52 to the bed or wall of a vehicle 5; a back horizontal cross beam 45 secured on one side to a top end 43 of the right vertical leg 41 and secured on an opposite side to a top end 53 of the left vertical leg 51; a horizontal support beam 57 secured at a front end 58 to the front horizontal cross beam 25 and secured at a back end 59 to the back horizontal cross beam 45; a first bracing member 60 having a proximal end 61 which is secured to the bottom end 22 of the right vertical leg of the front support structure 20 and having a distal end 62 which is secured to the top end 43 of the right vertical leg of the back support structure 40; a second bracing member 70 having a proximal end 71 which is secured to the bottom 42 end of the right vertical leg of the back support structure 40 and having a distal end 72 which is secured to the top end 23 of the right vertical leg of the front support structure 20; wherein the first bracing member 60 is secured to the second bracing member 70; a horizontal lift beam 100 slideably engaged to the front horizontal cross beam 25, the horizontal support beam 57, the back horizontal cross beam 45 and/or a combination thereof; wherein the slidable engagement permits the horizontal lift beam 100 to slide from the front end of the system 105 to the back end of the system 110 and from the back end of the system to the front end of the system to extend the range of the system 10; a trolley assembly 120 is slidably secured to the horizontal lift beam 100; and a hoist mechanism 140 secured to the trolley assembly 120, wherein the hoist mechanism 140, along with a clamping device 145, is used to raise, lower, orient and transport one or more stone slabs 15;

(b) extending the horizontal lift beam 100 to the back end 110 of the system, over the ground;

(c) positioning the trolley assembly 120 and the hoist mechanism 140 above a stone slab 15;

(d) lowering the hoist mechanism 140 and securing the stone slab 15 by engaging a clamping device 145 of the hoist mechanism 140;

(e) raising the clamping device 145 of the hoist mechanism 140 and the stone slab 15;

(f) repositioning the trolley assembly 120 and the hoist to a position near the middle third of the horizontal lift beam 100;

(g) retracting the horizontal lift beam 100 to the front end 105 of the system to secure the stone slab 15 within the vehicle 5;

(h) transporting the stone slab 15 to a desired location;

(i) extending the horizontal lift beam 100 to the back end 110 of the system 10, outside of the vehicle 5, over the ground;

(j) positioning the trolley assembly 120, the hoist mechanism 140, the clamping device 145 and the stone slab 15 outside of the vehicle and above the ground;

(k) lowering the clamping device 145 of the hoist mechanism 140 and the stone slab 15 to the ground and/or a stone slab transportation cart; and (l) disengaging the clamping device 145 of the hoist mechanism 140 from the stone slab 15.

Regarding the above method, stone slabs 15 are known and understood by those having knowledge in the art. Stone slabs 15 may refer to any materials which may be used as a horizontal surface in kitchens, bathrooms, lavatories, offices, workshops and workrooms which is generally installed upon a cabinet or similar structure. Stone slabs 15 may be made from any material known in the art. In one embodiment of the present invention, a stone slab 15 may be selected from the group including, natural stone (i.e., granite, marble), cultured stone, concrete, wood, composite material (i.e. Corian®, quartz), metal, tile, or a combination thereof.

Regarding the above method, front support structure 20 describes a structure which includes one or more right vertical legs 21 secured at its bottom end 22 to the bed or wall of a vehicle 5 and one or more left vertical legs 31 secured at a bottom end 32 to the bed or wall of a vehicle 5. The front support structure 20 further includes a front horizontal cross beam 25 secured on one side to a top end 23 of a right vertical leg 21 and secured on an opposite side to a top end 33 of a left vertical leg 31. The front support structure 20 may be comprised of tubular members (round, square, etc.) of varying lengths, gauges and thicknesses, solid members, or a combination thereof. In any of the above embodiments, the metal used may be selected from the group including, but not limited to, iron, steel, aluminum, magnesium, titanium, or any combination (i.e. alloy) thereof. The front support structure 20 may further include one or more frame supports 55 in order to secure, support and/or strengthen the crane system. (See FIGS. 8 and 9).

Regarding the above method, back support structure 40 describes a structure which includes one or more right vertical legs 41 secured at a bottom end 42 to the bed or wall of a vehicle 5 and one or more left vertical legs 51 secured at a bottom end 52 to the bed or wall of a vehicle 5. The back support structure 20 further includes a back horizontal cross beam 45 secured on one side to a top end 43 of a right vertical leg 41 and secured on an opposite side to a top end 53 of a left vertical leg 51. The back support structure 40 may be comprised of tubular members (round, square, etc.) of varying lengths, gauges and thicknesses, solid members, or a combination thereof. In any of the above embodiments, the metal used may be selected from the group including, but not limited to, iron, steel, aluminum, magnesium, titanium, or any combination (i.e. alloy) thereof. The back support structure 40 may further include one or more frame supports 55 in order to secure, support and/or strengthen the crane system. (See FIGS. 8 and 9).

Regarding the above method, the front support structure 20 and the back support structure 40 may be secured to one another using a horizontal support beam 57 having a front end 58 secured to the front support structure 20 and a back end 59 secured to the back support structure along with a first bracing member 60 having a proximal end 61 which is secured to the bottom end of a vertical leg of the front support structure 20 and having a distal end 62 which is secured to the top end of a vertical leg of the back support structure 40. A second bracing member 70 having a proximal end 71 which is secured to the bottom end of a vertical leg of the back support structure 40 and having a distal end 72 which is secured to the top end of a vertical leg of the front support structure 20. In one embodiment of the present invention, the first bracing member 60 is secured to the second bracing member 70. The bracing members may be comprised of tubular members (round, square, etc.) of varying lengths, gauges and thicknesses, solid members, or a combination thereof. In any of the above embodiments, the metal used may be selected from the group including, but not limited to, iron, steel, aluminum, magnesium, titanium, or any combination (i.e. alloy) thereof.

Regarding the above method, a horizontal lift beam 100 is slideably secured to the front horizontal cross beam 25 and slidably secured to the back horizontal cross beam 45 which permits the horizontal lift beam 100 to slide from the front end of the system to the back end of the system and from the back end of the system to the front end of the system to extend the lifting range of the system 10. In one embodiment of the present invention, the horizontal lift beam 100 is comprised of two or more sections which are telescopically engaged to one another in order to extend or retract as the horizontal lift beam 100 from the front of the system 10 toward the back of the system or from the back of the system 10 toward the front of the system depending on the needs of those using the system 10. The horizontal lift beam may be comprised of I-beams, tubular members (round, square, etc.) of varying lengths, gauges and thicknesses, solid members, or a combination thereof. In any of the above embodiments, the metal used may be selected from the group including, but not limited to, iron, steel, aluminum, magnesium, titanium, or any combination (i.e. alloy) thereof.

Regarding the above method, a trolley assembly 120, as used herein, refers to a device which is detachably or slidably secured to the horizontal lift beam 100. The horizontal lift beam 100 may be an I-beam as defined by those having skill in the art. In one embodiment, the shape of the horizontal lift beam 100 allows the trolley assembly 122 to traverse the length of the horizontal lift beam 100 using wheels (i.e., ball bearing wheels, etc.) or any other means of locomotion known in the art. The trolley assembly 120 allows a user of the crane system 10 to secure a stone slab 15 using the hoist mechanism 140, lift the stone slab 15 from within a vehicle 5 and maneuver the stone slab to the outside of the vehicle and lower the stone slab to one or more persons and/or a slab transportation cart to take the stone slab from the vehicle to the location where the slab is to be installed.

Regarding the above method, a hoist mechanism 140, as described herein, refers to a device which is secured to the trolley assembly 120, wherein the hoist mechanism 140 is used to raise, lower, orient and transport a stone slab 15 which is secured with a clamping device 145. The clamping device 145 is a device used for raising/lifting or lowering a load (I.e. a stone slab 15) by means of a drum or lift-wheel around which rope, cable or chain wraps. The hoist mechanism 140 may be operated manually, electrically or pneumatically driven and may use chain, fiber or wire rope as its lifting medium. In one embodiment of the instant invention, the hoist mechanism 140 may be operated as electrical, pneumatic, hydraulic, mechanical, or a combination thereof. In another embodiment, the hoist mechanism may include a winch which extends and retracts a cable 142 which is run through pulley 144 which is operationally associated with clamping device 145. In another embodiment, the vehicle 5 is selected from the group consisting of: a pick-up truck, a flat-bed truck, a moving truck, a box truck, or a combination thereof.

In one embodiment of the above-described method, the crane system 10 may further comprise a slab resting support 80 which includes a vertical support member 82 which is secured at a lower end 83 to the vehicle 5 and secured at a top end 84 near the top of one or more vertical legs (21, 31, 41, 51) and a horizontal support member 85 which emanates from the lower end 83 of the vertical support member 82 at ninety degrees so that the vertical support member is oriented at an angle to allow one or more stone slabs 15 to be temporarily secured for transport within the vehicle 5. In one embodiment of the instant invention, the angle created between the vertical support member 82 and the horizontal support member 85 may be in the range of 70 to 110°, 80 to 100°, 85 to 95° or any combination thereof.

In another embodiment of the above-described method, the front support structure 20 and/or the back support structure 40 further include one or more additional vertical legs (21, 31, 41, 51) for added strength and support of the crane system 10. Looking to FIGS. 8 and 9 there is shown in example of another embodiment of the instant invention wherein the front horizontal cross beam 25 and/or the back horizontal cross beam 45 each extend laterally to be secured to a wall of a vehicle 5 for added strength and support of the crane system 10.

FIGS. 1 through 7 illustrate an example of one embodiment of the crane system 10 used in the above method wherein the vertical legs (21 and 31) of the front support structure 20 and the vertical legs (41 and 51) of the back support structure 40 are vertical at their bottoms (22, 32, 42 and 52 respectively) and then angled inward resulting in the distance between the tops of the vertical legs being narrower than the distance between the bottoms of the vertical legs. This may also be thought of as an "A-frame" configuration. In one embodiment, the angle of the vertical legs where it alters from vertical to an angle is in the range of 5 to 45°, 10 to 40°, 15 to 35°, 20 to 30° or 35°. FIGS. 8 and 9 illustrate an example of one embodiment of the crane system 10 used in the above method wherein the system is secured with in a box truck.

The present invention may be embodied in other forms without departing from the spirit and the essential attributes thereof, and, accordingly, reference should be made to the appended claims, rather than to the foregoing specification, as indicating the scope of the invention. The invention illustratively discloses herein suitably may be practiced in the absence of any element which is not specifically disclosed herein.

What is claimed is:

1. A crane system for loading and unloading stone slabs comprising:
 a front support structure including:
 a right vertical leg secured at a bottom end to the bed or wall of a vehicle;
 a left vertical leg secured at a bottom end to the bed or wall of a vehicle;
 a front horizontal cross beam secured on one side to a top end of the right vertical leg and secured on an opposite side to a top end of the left vertical leg;
 a back support structure including:
 a right vertical leg secured at a bottom end to the bed or wall of a vehicle;
 a left vertical leg secured at a bottom end to the bed or wall of a vehicle;
 a back horizontal cross beam secured on one side to a top end of the right vertical leg and secured on an opposite side to a top end of the left vertical leg;
 a horizontal support beam secured at a front end to the front horizontal cross beam and secured at a back end to the back horizontal cross beam;
 a first bracing member having a proximal end which is secured to the bottom end of a vertical leg of the front support structure and having a distal end which is secured to the top end of a vertical leg of the back support structure;
 a second bracing member having a proximal end which is secured to the bottom end of a vertical leg of the back support structure and having a distal end which is secured to the top end of a vertical leg of the front support structure;
 wherein the first bracing member is secured to the second bracing member;
 a horizontal lift beam slideably engaged to a first rolling bracket secured to the front horizontal cross beam and extending downward to encircle and support the horizontal lift beam;
 a second rolling bracket secured to the horizontal life beam and extending upward to encircle and slideably engage the horizontal support beam;
 wherein said horizontal lift beam is longer than said horizontal support beam;
 wherein the slidable engagement of the first rolling bracket and the second rolling bracket permits the horizontal lift beam to slide from the front end of the system, extending over a front of the vehicle to the back end of the system and from the back end of the system to the front end of the system to extend the range of the system;
 a trolley assembly slidably secured to said horizontal lift beam;
 a hoist mechanism secured to said trolley assembly, wherein the hoist mechanism is used to raise, lower, orient and transport a stone slab; and
 a slab resting support which includes a vertical support which is secured at a lower end to said vehicle and secured at a top end to one or more vertical legs and a horizontal support member which emanates from the lower end of said vertical support in the range of from 70° to about 110° so that said vertical support is oriented at an angle to allow one or more stone slabs to be temporarily secured for transport within said vehicle.

2. The system of claim 1 wherein the vehicle is selected from the group consisting of: a pick-up truck, a flat-bed truck, a moving truck a box truck, or a combination thereof.

3. The system of claim 1 wherein the horizontal lift beam being an I-beam.

4. The system of claim 1 wherein the hoist mechanism being selected from the group consisting of: electrical, pneumatic, hydraulic, mechanical, or a combination thereof.

5. The system of claim 1 wherein the horizontal support member emanates from the lower end of said vertical support at ninety degrees.

6. The system of claim 1 wherein said front support structure and said back support structure being made from a tubular metal (round, square, etc.) of varying lengths, gauges and thicknesses.

7. The system of claim 1 wherein said front support structure and said back support structure further comprise one or more additional vertical legs for added strength and support of the system.

8. The system of claim 1 wherein the front horizontal cross beam and the back horizontal cross beam each extend laterally to be secured to a wall of a vehicle for added strength and support of the system.

9. The system of claim 1 wherein the vertical legs of said front support structure and the vertical legs of said back support structure being vertical at their bottoms and then angled inward resulting in the distance between the tops of the vertical legs being narrower than the distance between the bottoms of the vertical legs.

10. The system of claim 9 wherein the angle of the vertical legs being in the range of 10 to 30 degrees.

11. A method for loading and unloading one or more atone slabs onto and off of a vehicle comprising the steps of:
providing a crane system for loading and unloading stone slabs comprising: a front support structure including:
a right vertical leg, secured at a bottom end to the bed or wall of a vehicle;
a left vertical leg secured at a bottom end to the bed or wall of a vehicle:
a front horizontal cross beam secured on one side to a top end of the right vertical leg and secured on an opposite side to a top end of the left vertical leg;
a back support structure including:
a right vertical leg secured at a bottom end to the bed or wall of a vehicle;
a left vertical leg secured at a bottom end to the bed or wall of a vehicle;
a back horizontal cross beam secured on one side to a top end of the right vertical leg and secured on an opposite side to a top end of the left vertical leg;
a horizontal support beam secured at a front end to the front horizontal cross beam and secured at a back end to the back horizontal cross beam;
a first bracing member having a proximal end which is secured to the bottom end of the right vertical leg of the front support structure and having a distal end which is secured to the top end of the right vertical leg of the back support structure;
a second bracing member having a proximal end which is secured to the bottom end of the right vertical leg of the back support structure and having a distal end which is secured to the top end of the right vertical leg of the front support structure;
wherein the first bracing member is secured to the second bracing member;
a horizontal lift beam slideably engaged E first rolling bracket secured to the front horizontal cross beam and extending downward to encircle and support the horizontal lift beam;
a second roiling bracket secured to the horizontal lift beam and extending upward to encircle and slideably engage the horizontal support beam;
wherein said horizontal lift beam is longer than said horizontal support beam;
wherein the slideable engagement of the first rolling bracket and the second rolling bracket permits the horizontal lift beam to slide from the front end of the system, extending over a front of the vehicle, to the back end of the system and from the back end of the system to the front end of the system to extend the range of the system;
a trolley assembly slidably secured to said horizontal lift beam; and
a hoist mechanism secured to said trolley assembly, wherein the hoist mechanism is used to raise, lower, orient and transport one or more stone slabs;
a slab resting support which includes a vertical support which is secured at a lower end to said vehicle and secured at a to end to one or more vertical legs and a horizontal support member which emanates from the lower end of said vertical support in the range of from 70° to about 110° so that said vertical support is oriented at an angle to allow one or more stone slabs to be temporarily secured for transport within said vehicle;
extending said horizontal lift beam to the back end of the system, over the ground;
positioning said trolley and said hoist mechanism above a stone slab;
lowering said hoist mechanism and securing said stone slab by engaging said hoist mechanism;
raising said hoist mechanism and said stone slab;
repositioning said trolley and said hoist to a position near the middle third of said horizontal lift bean;
retracting said horizontal lift beam to the front end of the system to secure said stone slab within the vehicle;
transporting said stone slab to a desired location;
extending said horizontal lift beam to the back end of the system, outside of the vehicle, over the ground;
positioning said trolley, said hoist mechanism and said stone slab outside of said vehicle and above the ground;
lowering said hoist mechanism and said stone slab to the ground and/or a stone slab transportation cart; and
disengaging said hoist mechanism from said stone slab.

12. The system of claim 11 wherein the vehicle is selected from the group consisting of: a pick-up truck, a flat-bed truck, a moving truck, a box truck or a combination thereof.

13. The system of claim 11 wherein the horizontal lift beam being an I-beam.

14. The system of claim 11 wherein the hoist mechanism being selected from the group consisting of: electrical, pneumatic, hydraulic, mechanical, or a combination thereof.

15. The system of claim 11 further comprising a slab resting support which includes a vertical support which is secured at a lower end to said vehicle and secured at a top end near the top of one or more vertical legs and a horizontal support member which emanates from the lower end of said vertical support at ninety degrees so that said vertical support is oriented at an angle to allow one or more stone slabs to he temporarily secured for transport within said vehicle.

16. The system of claim 11 wherein said front support. structure and said back support structure being made from a tubular metal (round, square, etc.) of varying lengths, gauges and thicknesses.

17. The system of claim 11 wherein the vertical legs of said front support structure and the vertical legs of said back support structure being vertical at their bottoms and then angled inward resulting in the distance between the tops of the vertical legs being narrower than the distance between the bottoms of the vertical legs.

18. The system of claim 17 wherein the angle of the vertical legs being in the range of 10 to 30 degrees.

19. The system of claim 11 wherein said front support structure and said back support structure each further comprise one or more additional vertical legs for added strength and support of the system.

20. The system of claim 11 wherein the front horizontal cross beam and the back horizontal cross beam each extend laterally to be secured to a wall of a vehicle for added strength and support of the system.

* * * * *